United States Patent
Linger

(12) 
(10) Patent No.: US 6,331,092 B1
(45) Date of Patent: Dec. 18, 2001

(54) CORNER JOINT FOR PROFILE SECTIONS

(76) Inventor: Mats Linger, Karsegardon, 439 00 Onsala (SE)

( * ) Notice: Subject to any disclaimer, the term of this patent is extended or adjusted under 35 U.S.C. 154(b) by 0 days.

(21) Appl. No.: 08/930,958

(22) PCT Filed: Mar. 27, 1996

(86) PCT No.: PCT/SE96/00401

§ 371 Date: Jun. 26, 1998

§ 102(e) Date: Jun. 26, 1998

(87) PCT Pub. No.: WO96/30658

PCT Pub. Date: Oct. 3, 1996

(30) Foreign Application Priority Data

Mar. 31, 1995 (SE) .................................................. 9501188

(51) Int. Cl.[7] .................................................. F16B 9/00
(52) U.S. Cl. ........................ 403/382; 403/403; 403/367; 411/85
(58) Field of Search ................................. 403/382, 402, 403/401, 403, 205, 367, 341; 411/84, 85, 553, 552, 551

(56) References Cited

U.S. PATENT DOCUMENTS

| | | | |
|---|---|---|---|
| 4,666,355 | * | 5/1987 | Stover .................................... 411/85 |
| 4,895,484 | * | 1/1990 | Wilcox .................................... 411/85 |
| 5,054,978 | * | 10/1991 | Kowalski ................................ 411/85 |
| 5,116,161 | * | 5/1992 | Faisst ................................ 403/403 X |

FOREIGN PATENT DOCUMENTS

2468784 * 5/1981 (FR) ...................................... 411/85

* cited by examiner

*Primary Examiner*—Lynne H. Browne
*Assistant Examiner*—John R. Cottingham

(57) ABSTRACT

A corner joint for profile sections (13) provided with one or more longitudinal channels (16), in connection with the outside of the profile section via a likewise longitudinal slot opening (12). The channel (16) constitutes an attachment for a nut means (11) which cooperates via screw means (14) with connector fittings (17, 24). Each screw means (14) is provided with a lock means (10) which is located in the slot opening (12) between the nut means (11) and the connector fittings (17, 24). The lock means (10) is provided with a screw opening (15) and means (20) for locking the nut means (11) against rotation out of a locking position. The lock means (10) is also provided with at least one boss (23) which during rotation of the nut means (11) from its locking position cooperates with a shoulder (22) on said nut means, in order to position the nut means and facilitate its removal from the channel (16).

3 Claims, 3 Drawing Sheets

CORNER JOINT FOR PROFILE SECTIONS

FIELD OF THE INVENTION

The present invention refers to a corner joint for profile sections provided with one or more longitudinal channels, in connection with the outside of the profile section via a likewise longitudinal slot opening and which channel constitutes a n attachment for a nut means which cooperates via screw means with connector fittings, wherein each screw means is provided with a lock means which is located in the slot opening between the nut means and the connector fittings, which lock means is provided with a screw opening and means for locking the nut means against rotation out of a locking position.

BACKGROUND OF THE INVENTION

Profile section beams may for example produced by extruding aluminum, with one or more longitudinal channels, in connection with the outside via a likewise longitudinal slot opening. These channels may be used for joining two or more sections by means of screw joints and connector fittings, e.g. for building a stand frame.

It is known to use a type of screw joints with a nut means which is entered into the channel via the section end to act as an attachment for a screw which extends via the slot into the channel. With these joint systems it is difficult to make modifications of an existing frame, e.g. for attaching new sections in the direction upwards or to the side, because new nut means must be entered at the section end.

It is also known to use scew joints with a nut means which is s o designed that it in one position of rotation may be entered from the outside through the slot into the channel, after which it in another position of rotation, via protruding shoulders, form a locking inside the channel. Thus, these screw joints make it possible to enlarge an existing stand rapidly and efficiently, e.g. from the middle of a section.

One drawback with these known screw joints is that the nut means may be displaced, by vibrations or other unintentional influence from its locking position, wherein the screw joint may loosen. This may lead to damages to people and/or to machines.

THE TECHNICAL PROBLEM

One purpose of the present invention is therefore to provide a screw joint, by which the nut means can not unintentionally be displaced from its position of locking.

THE SOLUTION

This object is accomplished according to the invention because the lock means is provided with at least one boss which during rotation of the nut means from its locking position cooperates with a shoulder on said nut means, in order to position the nut means and facilitate its removal from the channel.

DESCRIPTION OF THE DRAWINGS

The invention will be described hereinafter with reference to embodiments shown in the enclosed drawings, wherein.

DESCRIPTION OF EMBODIMENTS

Figure 1:
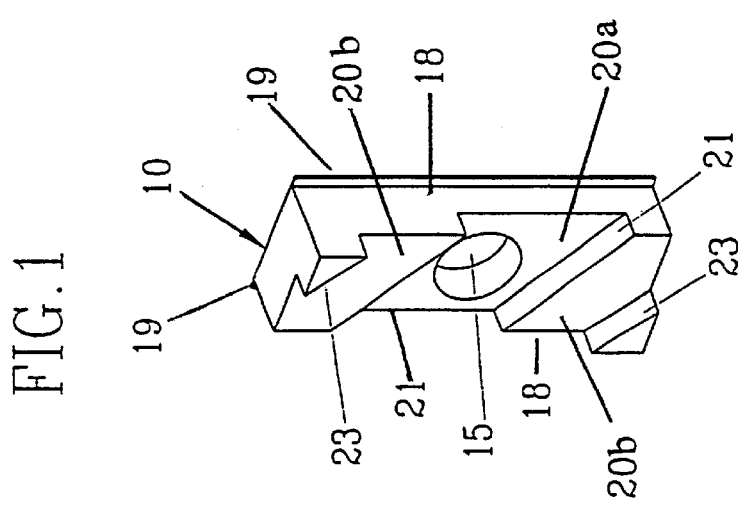
FIG. 1 shows a lock means which is a part of the screw joint according to the invention.
Figure 2:
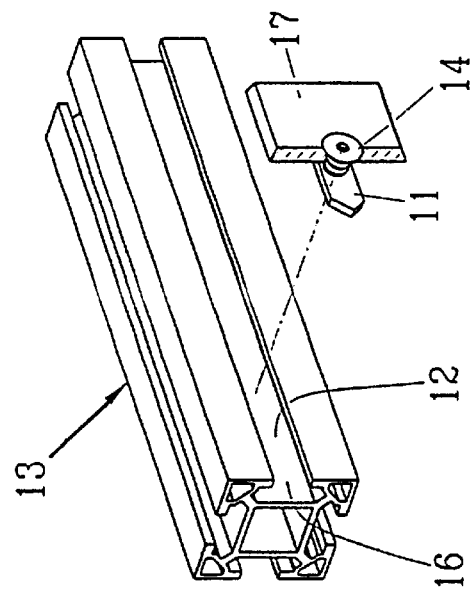
FIG. 2 shows a screw joint according to the invention during assembly at a profile section.
Figure 3:
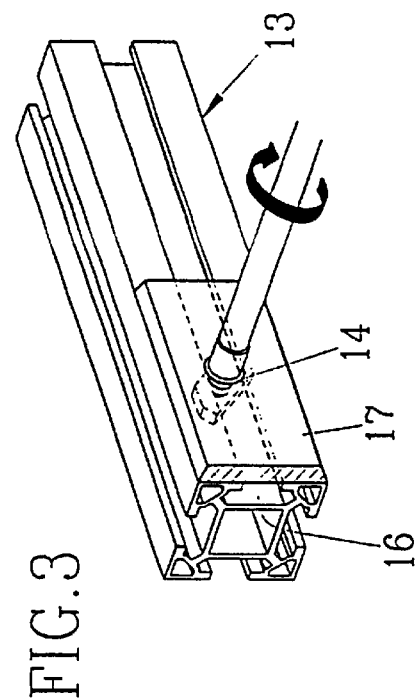
FIG. 3 shows the same screw joint as in FIG. 2 in its position of locking.

The lock means 10 shown in detail in FIG. 1, is long and narrow, rectangular with a width substantially corresponding to the width of the nut means 11 (see FIG. 2–5). In the assembled position, the lock means 10 will be located inside the slot 12 on a profile section beam 13, wherein a screw 14 extends through the opening 15 into the longitudinal channel 16 of the profile section 13 cooperating with a screw threaded hole in the nut means 11.

In this position, the lock means 10 is situated between the nut means 11 and the connector fitting 17, wherein the longitudinal sides 18 of the lock means will support against the side edges of the slot 12 and side flanges 19 act as stops to prevent the lock means from passing through the slot. A countersink section 20A of lock means 10 has the same width as the nut means 11 and has been made at an acute angle to the longitudinal direction of the lock means. "Adjacent to the angles, of countersink section 20a are end sections 20b, which, with countersink section 20a have rectangle formation, defined by the side flanges 19 and "the longitudinal sides 18, just opposite the screw opening 15.

When tightening the screw 14, the nut means 11 will "bottom inside the countersink section 20a, and form a continuous planar surface with the end sections 20b, and contact "the edges 21 of the countersink section for support. This means that the nut means during tightening will be locked in a stable position of locking, in which the two shoulders 22 of the nut means 11 act as locking for the entire screw joint inside the channel 16.

If the screw 14 again is turned in the direction of loosening, the nut means 11 may move out of the countersink section 20a after which it may turn out of its locking position. Now an obliquely cut edge of the shoulders 22 of the nut means abuts a corresponding oblique boss 23 at each end of the lock means 10, said two bosses positioning the nut means 11, so that the screw joint may easily be removed from the section 13.

Figure 4:
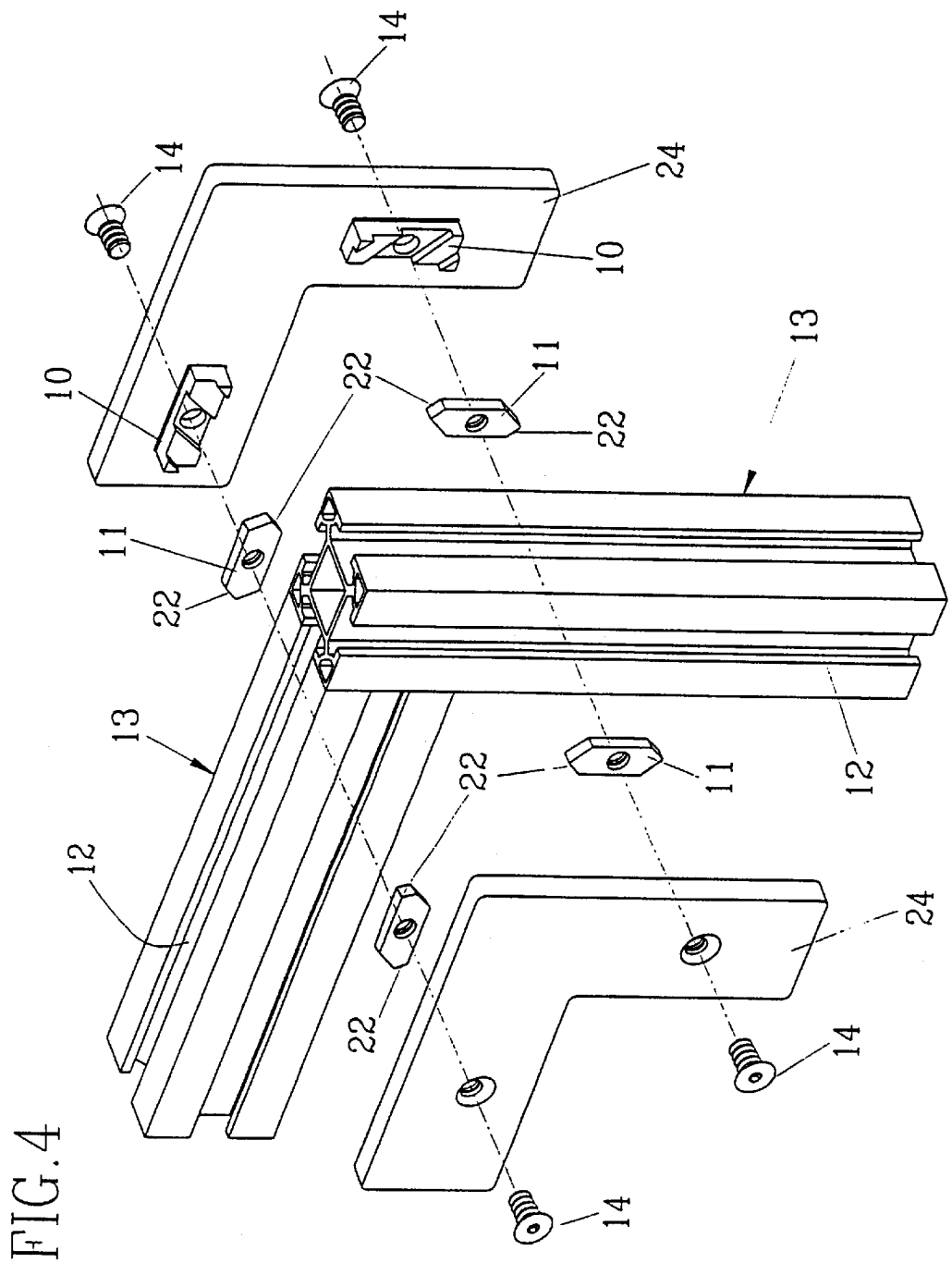
FIG. 4 shows a screw joint intended for a L-coupling in an exploded view.

The lock means 10 may preferably be manufactured from a plastic. FIG. 4 shows one embodiment where L-shaped connector fittings 24 from plastic are moulded in one piece with the lock means 10. Alternatively, the lock means may, as is shown in FIG. 1, be manufactured as separate units.

Figure 5:
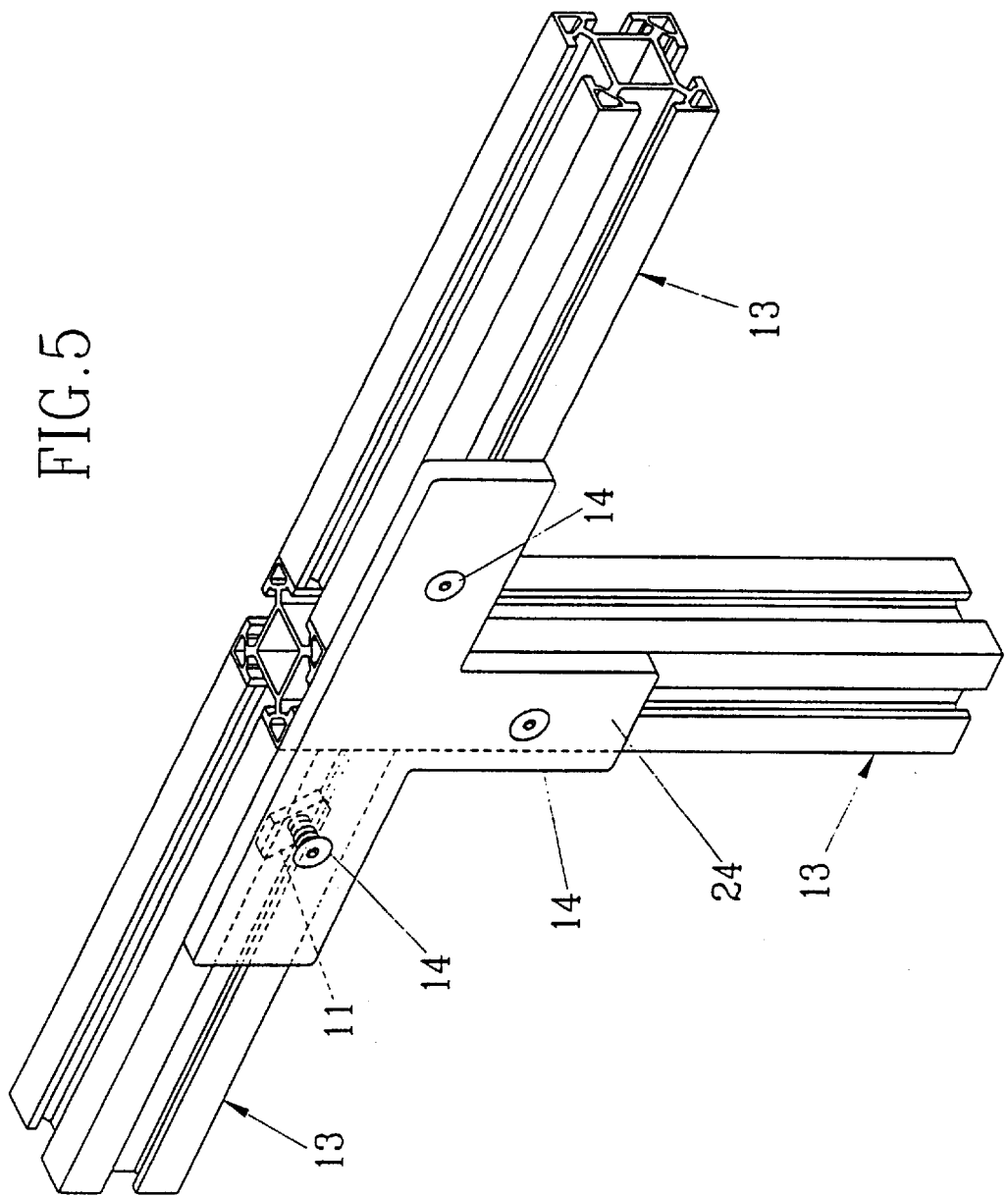
FIG. 5 shows a screw coupling intended for T-coupling in the assembled condition.

FIG. 5 shows another embodiment with T-shaped connector fittings 24.

The invention is not limited to the above described embodiment, instead more variants are conceivable. For example, the connector fittings may be designed differently. The lock means and the nut means may also be differently designed from what is shown.

What is claimed is:

1. A corner joint for profile sections provided with nut means and one or more longitudinal channels in connection with the outside of the profile section via a longitudinal slot opening, the longitudinal slot opening extending in substantially the same direction as the longitudinal channels, the channels constituting an attachment to the nut means which cooperates via screw means with connector fittings, wherein each screw means is provided with a lock means which is located in the slot opening between the nut means and the connector fittings, which the lock means is provided with a screw opening and means for locking the nut means against rotation out of a locking position characterized in:

that the lock means is provided with at least a first planar surface, in the form of a countersink for receiving and fixation of a portion of the nut means in a first, locked position, in which the nut means is located substantially across from the slot opening;

that the lock means, at a different level, is provided with a second planar surface, being substantially parallel to the first planar surface, for receiving the nut means in a second, unlocked position, in which the nut means is located substantially parallel with the slot opening, and;

that the second surface of the lock means is provided with at least one boss, which cooperates with a shoulder on the nut means to stop the nut means during rotation from the first, locked position to the second, unlocked position, the angle of rotation being less than 90°.

2. A corner joint according to claims 1, characterized in that the width of the lock means is substantially the same as the width of the nut means.

3. A corner joint according to claim 1, wherein the angle of rotation between the first, locked position of the nut means to the second, unlocked position of the nut means is about 45°.

* * * * *